United States Patent [19]

Garfein

[11] 3,725,884

[45] Apr. 3, 1973

[54] FLYING HEAD SUPPORT WITH DAMPING MEANS

[75] Inventor: Irwin B. Garfein, Los Angeles, Calif.

[73] Assignee: Engineered Data Peripherals Corporation, Santa Monica, Calif.

[22] Filed: Aug. 20, 1970

[21] Appl. No.: 65,516

[52] U.S. Cl. ......................340/174.1 E, 179/100.2 P

[51] Int. Cl. ..............................................G11b 5/60

[58] Field of Search ................340/174.1 F, 174.1 E; 346/74 MC; 179/100.2 P, 100.2 CA, 100.2 C

[56] References Cited

UNITED STATES PATENTS

| | | | |
|---|---|---|---|
| 3,180,943 | 4/1965 | Van Oort | 340/174.1 E |
| 3,202,772 | 8/1965 | Thomas, Jr. et al. | 179/100.2 P |
| 3,071,773 | 1/1963 | Haughton et al. | 340/174.1 E |
| 3,412,384 | 11/1968 | Anderson | 340/174.1 E |

*Primary Examiner*—Vincent P. Canney
*Attorney*—Smyth, Roston & Pavitt

[57] ABSTRACT

A flying head support with damping means includes a spring support for a magnetic head, which spring support maintains the magnetic head adjacent to a magnetic disc and wherein a thin film of air is produced between the head and the disc by the rotation of the disc. Damping means are supported relative to the spring support and with the damping means pressing against the spring support to damp vibrations in the magnetic head.

9 Claims, 4 Drawing Figures

INVENTOR.
Irwin B. Garfein
By Smyth, Roston & Pavitt
ATTORNEYS

INVENTOR
Irwin B. Garfein
By Smyth, Roston & Pavitt
ATTORNEYS

FLYING HEAD SUPPORT WITH DAMPING MEANS

The present invention is directed to a support including damping means for a flying head. Flying magnetic heads are used to provide for a recording or readout of information on magnetic discs. Normally, the magnetic head includes an airfoil and is supported to lie on the magnetic disc. The magnetic head is normally supported in a flexible manner so as to allow the head to move away from the disc. As the disc rotates, the airfoil included in the magnetic head produces a thin film of air between the head and the disc so that the magnetic head flies over the surface of the magnetic disc.

Prior art magnetic recording and reproducing systems make use of a spring force such as the flexible mounting and the aerodynamic design of the recording head to accomplish a stable flight of the magnetic head over the surface of the disc. The boundary layer of air trapped on the surface of the disc presents an opposing force to the spring force until a critical value or boundary layer is reached after which the force tends to reverse sign and pulls the magnetic head toward the recording surface. It is therefore desirable to have the magnetic head maintained in the condition where the above described forces oppose each other so that stable flight is obtained. At this time the head represents a mass maintained between two opposing springs one of which represents the flexible mounting and the other of which represents the aerodynamic force.

In the event of a transient condition caused by factors such as imperfections or variations of the recording surface, dirt or other contamination between the disc and the head, vibrations caused externally or by the drive motor, vibrations encountered during the variable conditions of takeoff and landing on the disc surface, etc. These minor disturbances may tend to build up to excessive levels unless checked before they reach a magnitude sufficient to cause a break through the boundary layer and thereby produce a head crash.

It is also desirable with magnetic disc recording and reproducing systems to increase the speed of the disc so as to increase the bandwidth of the information recorded or reproduced from the disc. However, as the speed of the magnetic disc increases, vibration of the system also increases, which in turn may produce vibration in the magnetic head.

This vibration in the magnetic head and the vibrations produced by other causes and described above, may produce head bounce, which head bounce provides for variations in the output signal from the magnetic head or the signal recorded on the magnetic disc. This head bounce actually provides for changes in the distance between the head and the disc. As an example, the changes in the distance between the magnetic head and the magnetic disc will affect the amplitude of the output signal from the magnetic head. In an analog signal, the vibrations of the magnetic head directly produce changes in amplitude of the analog signal. In a digital signal, the vibrations of the magnetic head produce a phase shift of the digital signal, which phase shift would in turn provide for changes in triggering.

In the extreme situation as described above, the flying head may actually contact the magnetic disc, which condition is known as a "head crash," and which head crash, at the high speed of rotation of the magnetic disc, may produce severe damage to the surface of the magnetic disc.

It is, therefore, desirable to provide for the increased speed of rotation of the magnetic disc but with some means to decrease the vibrations of the magnetic head produced by the various causes described above. The present invention provides for such a system in that the magnetic head is supported by a spring support means which may be in the shape of a leaf spring. When the magnetic disc is not rotating, the magnetic head is actually maintained in contact with the disc. As the speed of rotation of the disc increases, the flow of air between the head and the disc over the airfoil lifts the magnetic head off of the disc and the head is now in a flying condition. It is desirable that the distance between the head and the disc remain relatively constant.

The present invention also includes a damping means supported relative to the spring support for the magnetic head. The damping means is similar in configuration to the spring support and actually includes a damping member supported by a spring member to press against the spring support for the magnetic head so as to provide for a shear type damper to damp any vibrations in the magnetic head.

The flying head support means including damping of the present invention may have the two support members formed from beryllium copper leaf spring members. One leaf member forms the spring support for the magnetic head and the other leaf member forms the spring support for the damping means and with the damping means formed from silastic rubber pad members located between the leaf members.

A clearer understanding of the invention will be had with reference to the following description and drawings wherein.

Figure 1:
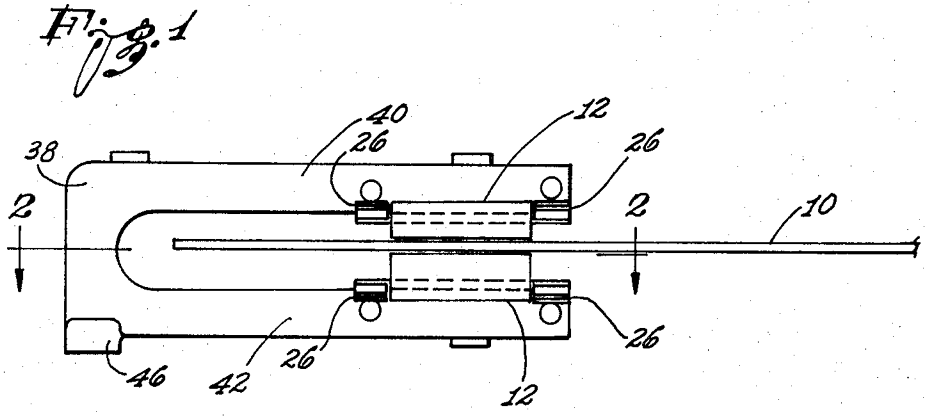
FIG. 1 illustrates a front view of a pair of the flying head support means including damping located on either side of a magnetic disc member.
Figure 2:
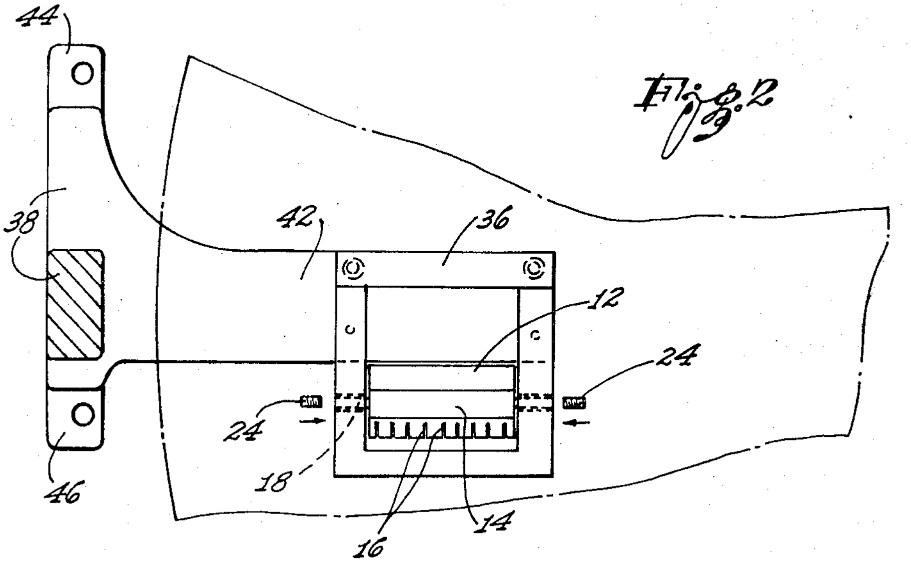
FIG. 2 illustrates a top view of the bottom one of the flying head support means including damping taken along line 2—2 of FIG. 1.

The flying head support structure including damping means of the present invention may be used to provide for the support of the magnetic head in a disc memory system of the type shown in U.S. patent application Ser. No. 776,936 filed in the name of Irwin B. Garfein and Allen E Garfein on Nov. 19, 1968. In that patent application, a disc memory system is shown, including a plurality of magnetic head members which are supported relative to a magnetic disc.

As the speed of the disc in the magnetic disc system increases, this provides for an increase in the bandwidth of the signal which may be recorded or reproduced. However, an increase in the speed of the disc also provides for an increase in the vibration of the system which, in turn, produces vibrations in the magnetic heads. Also vibrations are caused by imperfections or variations of the disc surface, dirt and other contaminants between the disc and the head, variable conditions encountered during takeoff and landing, etc. Since these magnetic heads normally fly over the disc as the disc rotates, with a thin film of air between the disc and the head, the vibrations may cause head bounce which in turn produces variations in the signals recorded or reproduced.

In FIGS. 1 through 4, the flying head support means with damping of the present invention is identical for the magnetic heads on either side of a magnetic disc 10. The magnetic heads 12 are supported to lie on both sides of the disc 10 and each of the magnetic heads 12 includes a groove 14 disposed on the side of the head located adjacent to the disc 10. The groove 14 is shaped to act as an airfoil and provides for the head's flying over the disc as the disc rotates.

The magnetic head 12 is actually a multitrack head and is constructed to include a plurality of separate air gaps 16 so as to provide for the recording or reproduction of a plurality of tracks of information on the magnetic disc 10. The magnetic head 12 also includes a rod member 18 which passes through the magnetic head and is used to support the magnetic head within the flying head support structure in a manner to be explained.

Figure 3:
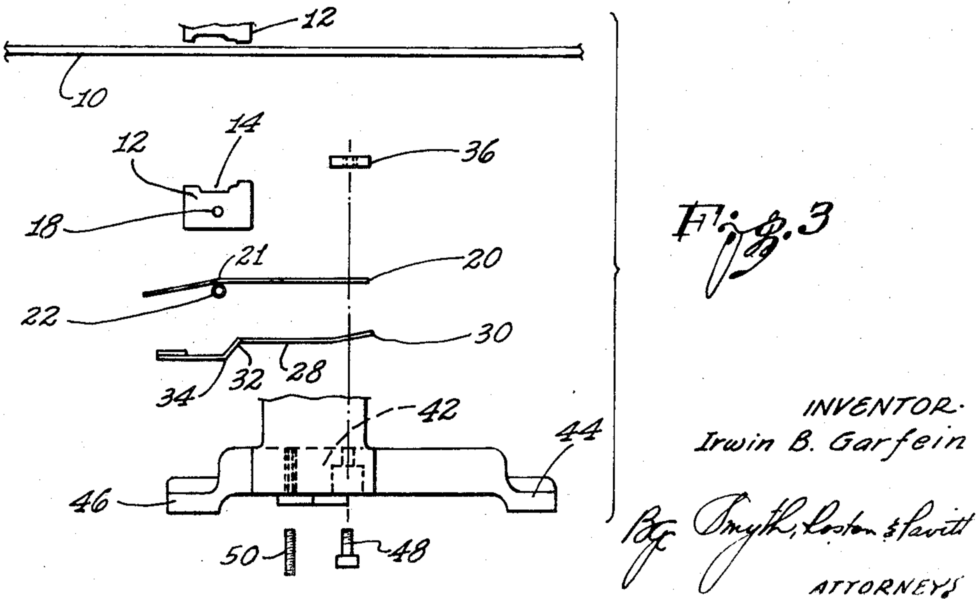
FIG. 3 illustrates a side view of FIG. 2 and, in addition, shows the various portions of the flying head support means with damping in an exploded manner.
Figure 4:
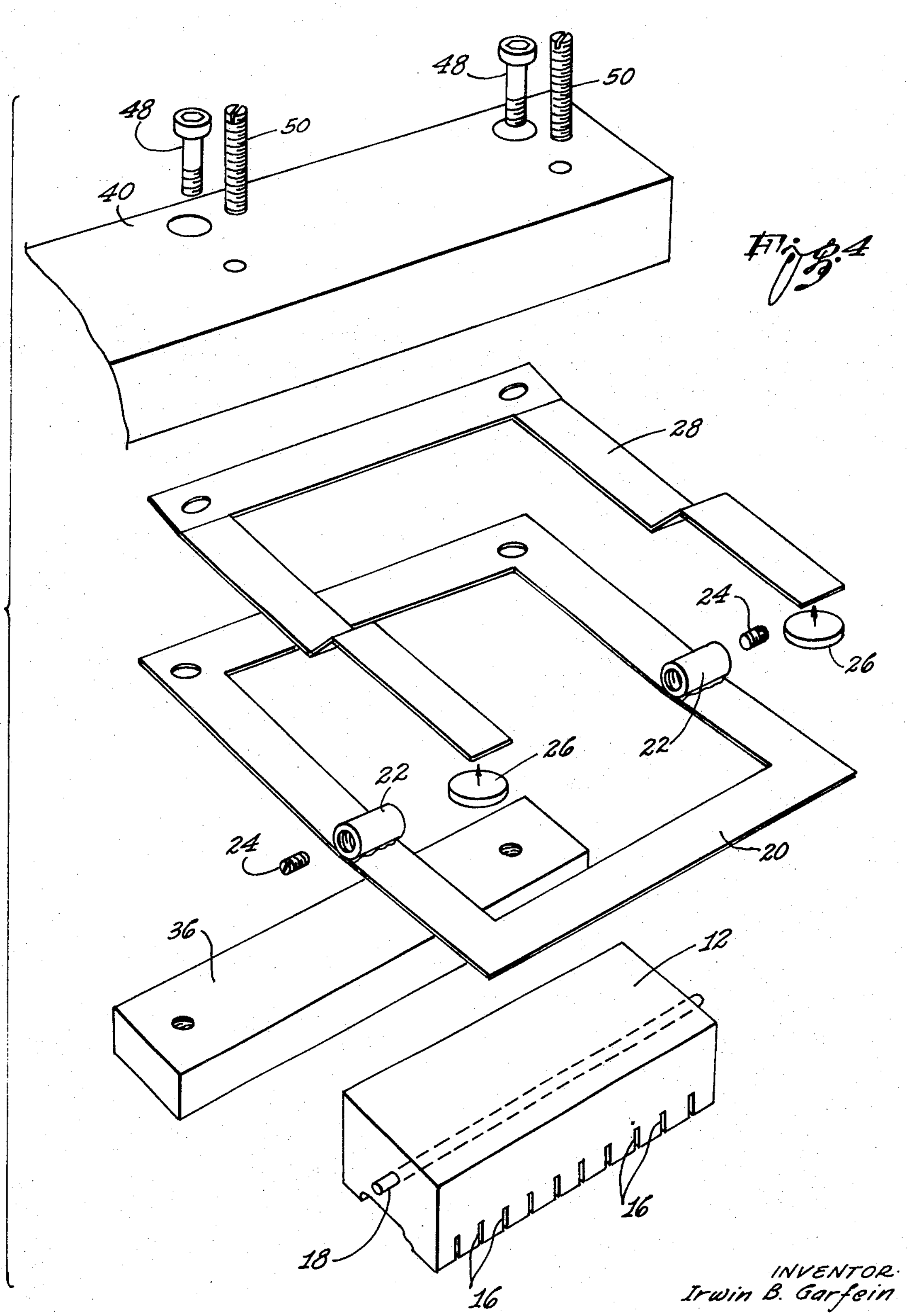
FIG. 4 illustrates the top one of the flying head support means, including damping, of FIG. 1 in an exploded perspective view.

The flying head support structure of the present invention includes a spring support member 20 having a substantially square configuration and formed from a beryllium copper leaf spring member. As can be seen in FIG. 3, the spring support member 20 is bowed at a position 21 approximately one-third of the way along its length. At the point 21 where the spring member 20 is bowed, tube members 22 are welded to the reed. The rod member 18 of the magnetic head 12 fits within the tube members 22 so that the head member is supported within the spring support member 20. Set screws 24 are disposed within the tube members 22 so as to retain the rod member 18 in position.

Damping means such as pad members 26 formed from material such as a silastic rubber are supported relative to the spring support 20 by a damping means support member 28. The damping means support member may be similar to the spring support member 20 in being formed from a beryllium copper leaf spring member. The damping means support member 28 has a U configuration and the open end is nearest the magnetic head member 12.

The damping means support 28 may be bent into the configuration shown in FIG. 3 and specifically may be bent at positions 30, 32 and 34 so as to provide for the damping means 26 being pressed against the spring support member 20 when the entire structure is clamped together. The clamping is accomplished using the clamping plate 36 in combination with the member 38 which supports the entire structure. Specifically, the member 38 is formed as a U-shaped member having arms 40 and 42 which extend on either side of the disc 10. The member 38 is mounted using mounting flanges 44 and 46 to a main plate member in a manner as shown in the above-referenced application Ser. No. 776,936.

The flying head support means with damping of the present invention is clamped between the plate 36 and either one of the arms 40 or 42 using screw means 48. Specifically, the screw means 48 pass through one of the arms 40 or 42 to engage plate member 36 and provide for a secure clamping of the spring support 20 and the damping support 28. Because of the bend of the damping support 28 at position 30, and because of the bowing of the spring support 20 at position 21, the damping pads 26 are brought into secure engagement with the spring support 20 to prevent vibrations of the magnetic heads even as the speed of the magnetic disc 10 increases.

In order to provide for an adjustment of the entire flying head support means relative to the magnetic disc and specifically to provide for an adjustment of the magnetic head 12 relative to the magnetic disc 10, set screws 50 are disposed through the arms 40 or 42 to engage the flying head support means. Upon a proper adjustment of the set screws 50, the head may be moved into the proper position relative to the disc 10.

It can be seen, therefore, that as the speed of the disc increases, which would increase the air speed over the airfoil 14, the magnetic head would tend to move further away from the disc. This movement of the head would increase the engagement between the damping pads 26 and the spring support 20 since, as the head 12 is moved away from the disc 10, the spring support 20 and the damping support 28 are moved into closer engagement.

The damper structure described above provides for a shear type damping. As the head has the tendency to fly over the disc a variation of height with respect to the mounting tends to shorten one leaf spring and lengthen the other leaf spring thereby producing a shear force on the damping material between the two leaf springs. The damper material is selected to absorb some of this shear energy thereby tending to dampen vibrations and prevent their uncontrolled buildup which may result in a boundary layer break down and head crash.

Any vibrations in the system, which would be at their maximum at the outermost position of the spring support 20, are damped by the pad members 26. The damping means is therefore provided at the position where it may accomplish the most effective damping.

The leaf springs form a parallelogram with the damping material therebetween to achieve damping while reducing the overall mass of the system. The low mass of the system is important when trying to maintain low forces to permit takeoff and landing from the disc without excessive wear to either the recording head or the disc surface.

Also, since the damping is provided by a very light structure including the damping support means 28 and the pads 26, the damping means does not affect the ability of the magnetic head 12 to fly over the surface of the disc 10 as the disc rotates. The ultimate effect, therefore, is to smooth out any head bounce so as to eliminate variations in the signals recorded on or reproduced from the magnetic head.

It is to be appreciated that the flying head support with damping of the present invention may be used in magnetic record and readout systems other than the disc memory system shown in application Ser. No. 776,936 and that the invention is only to be limited by the appended claims.

I claim:

1. A flying head support means with damping for a magnetic head, including:

a spring support member for supporting the magnetic head, and damping means including damping material supported relative to the spring support member and with the damping material pressed against the spring support member to damp vibrations of the magnetic head.

2. The flying head support means of claim 1 wherein the spring support member is formed as an elongated spring member and with the damping material disposed against the spring member at a position adjacent to the magnetic head.

3. The flying head support means of claim 1 wherein the spring support is formed as an elongated spring member and wherein the damping material is supported relative to the spring support by a second elongated spring member and wherein the spring support and the support for the damping material are disposed relative to each other to press the damping material against the spring support.

4. The flying head damping means of claim 1 wherein the spring support is an elongated spring member and wherein the damping material is supported by a second elongated spring member and wherein the spring support and the support means for the damping means are clamped between two members at one end of the spring support and the support means for the damping means.

5. The flying head damping means of claim 4 wherein the spring support includes a first pair of spaced elongated spring members connected at their outer ends and with the magnetic head supported between the first pair of spaced elongated spring members and wherein the damping material support includes a second pair of spaced elongated spring members located adjacent to the first pair and with the damping material disposed at the end of the second pair at a position opposite to the position where the spring support and the damping material are clamped together.

6. The flying head support means of claim 1 wherein an additional spring support means and additional damping material are provided and including a mounting member for maintaining the first flying head support means on one side of a magnetic disc and for supporting the second magnetic head damping material on the opposite side of the magnetic disc.

7. A flying head support means including:

a first spring support member forming a flat rectangular spring member and with an opening in the flat magnetic spring member to receive the magnetic head within the opening, and a damping means including damping material supported relative to the first spring support and with the damping material of the damping means supported to press against the spring support to dampen vibrations in the magnetic head.

8. The flying head support means of claim 7 wherein the damping material of the damping means is formed as a pair of damping pads supported at the ends of the second spring support members and maintained against the first spring support at a position where vibrations of the spring support are at a maximum.

9. The flying head support means of claim 7 wherein the damping material of the damping means is supported at the end of a pair of elongated spring members which are disposed to either side of the magnetic head and with the damping material of the damping means formed as damping pads located at the ends of the elongated spring members to provide damping to either side of the magnetic head.

* * * * *